Oct. 9, 1923.
1,470,164
J. R. HALTERMAN
GRINDING BAR
Filed April 25, 1922
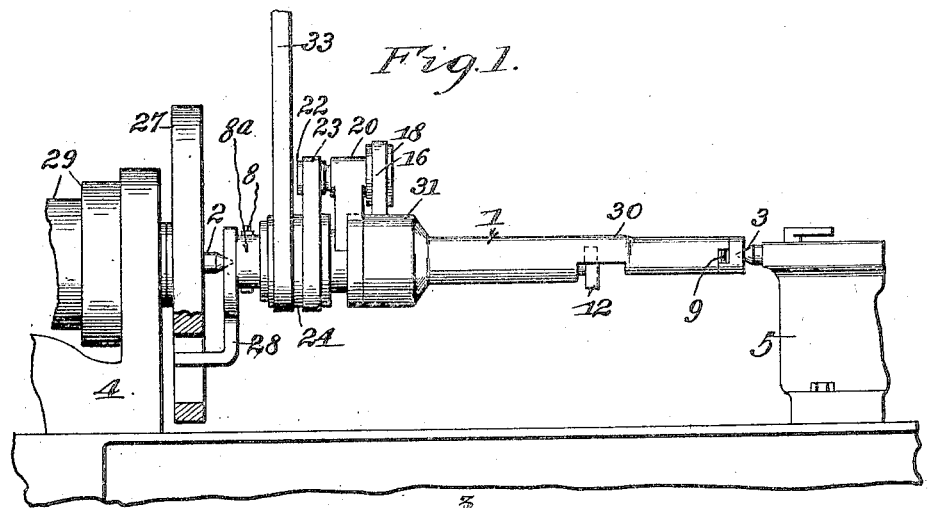
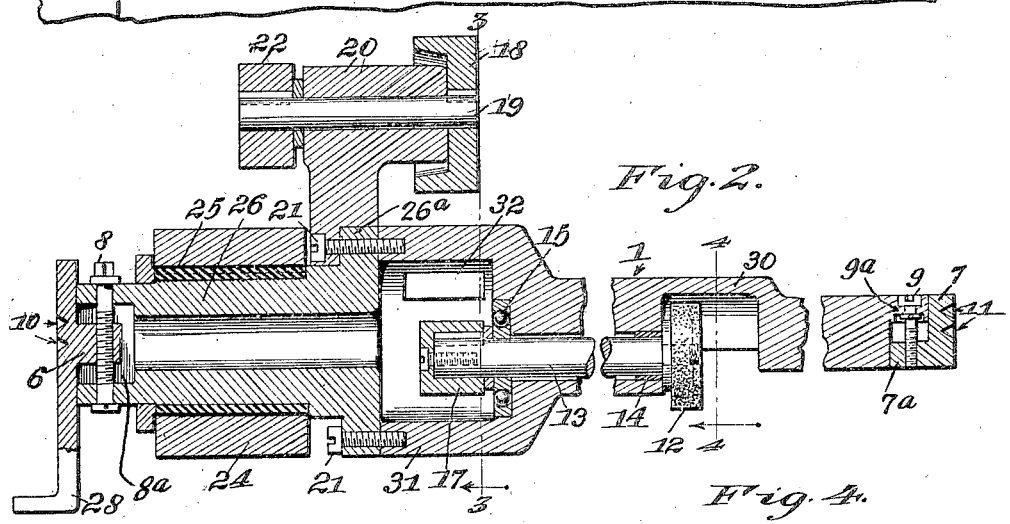
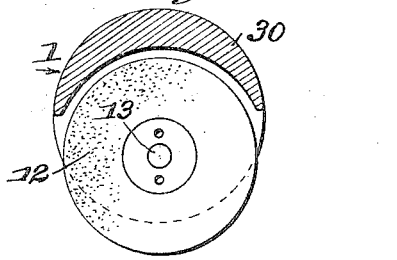
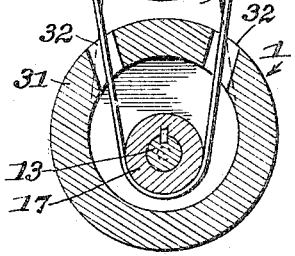
WITNESSES
R. C. Thomas
J. P. Schrott
INVENTOR
J. R. Halterman
BY
ATTORNEYS Patented Oct. 9, 1923.

1,470,164

UNITED STATES PATENT OFFICE.

JAMES RAYMOND HALTERMAN, OF MILES CITY, MONTANA.

GRINDING BAR.

Application filed April 25, 1922. Serial No. 556,452.

*To all whom it may concern:*

Be it known that I, JAMES R. HALTERMAN, a citizen of the United States, and a resident of Miles City, in the county of Custer and State of Montana, have invented certain new and useful Improvements in Grinding Bars, of which the following is a specification.

My invention relates to improvements in grinding apparatus to be used in connection with lathes and other suitably adapted machinery, and it consists in the constructions, combinations and mode of operation herein described and claimed.

One of the objects of the invention is to provide a grinding bar (including a grinding wheel) to be used between the centers of the lathe, means being provided to cause the grinding device to revolve in circles of various radii, thereby adapting the grinding bar to cylindrical objects of various internal diameters.

Other objects and advantages will appear in the following specification, reference being had to the accompanying drawing, in which:—

Fig. 1 is a side elevation of the improved grinding bar, illustrating enough of a lathe to show its application, Fig. 2 is a longitudinal section, parts being broken away, to enable contraction of the view so that it may be shown on a larger scale, Fig. 3 is a cross section on the line 3—3 of Fig. 2, and Fig. 4 is a cross section on the line 4—4 of Fig. 2.

Fig. 1 illustrates enough of a lathe to make the application of the invention clear. The grinding bar 1 is fitted between the centers 2 and 3 of the head and tail stocks 4 and 5, the points of contact between the grinding bar and the respective centers comprising blocks 6 and 7 which are adjustable at 8 and 9 so that any one of a plurality of recesses 10 and 11 in the respective blocks may be employed to adjust the radius of the circle generated by the grinding wheel 12.

The adjusting screw 8 passes through a recessed part $8^a$ of a portion of the grinding bar said recess providing a place in which the block 6 may work. Both screws 8 and 9 have swivel mountings. The mounting of the screw 9 occurs in a flange $9^a$ which is formed by cutting away the nether part of the bar. The flange $7^a$ of the block 7 which is correspondingly cut, works in the space thus provided.

This wheel is mounted on the end of a shaft 13 which has a main bearing 14 on the grinding arm and also a combination radial and thrust ball bearing 15. The grinder shaft is driven at high speed by a belt 16 which is applied to a pulley 17 on the grinder shaft and to a pulley 18 on a counter-shaft 19 which in turn is supported in a bearing 20 rising from a part of the grinder arm structure where it is secured by the means 21. The other end of the counter-shaft 19 carries a pulley 22 which is driven by a belt 23 from a large pulley 24 which has bearing at 25 on the hub 26 of the grinding arm. The hub has a flange $26^a$ from which the bearing rises at the place where it is attached by the screw 21. The entire bar is turned as a unit on the centers 2 and 3, the chuck plate 27 of the head stock with which the dog-shaped extension 28 of the block 6 has connection, being turned by a belt which is adapted to be applied to any one of the pulleys 29 of various diameters.

It is to be observed that the grinding wheel 12 is hooded at 30. This hood is a necessary part of the grinding bar as it connects the portions of the bar at the left and right of the wheel, but it also incidentally serves to protect the grinding wheel from a blow which might otherwise injure it. The high speed pulley 17 is concealed in the hollow base 31 of the grinding bar, which forms a housing around the high speed pulley. This housing has openings 32 at which the belt 16 is introduced.

The flange $26^a$ of the hub 26 is secured to the edge of the base or housing 31.

In operation, the grinding bar is fitted between the lathe centers 2 and 3. The grinding shaft 13 will revolve at a high speed due to the ratios between the various pulleys 24, 22, 18 and 17, and as the grinding wheel 12 revolves at a high speed, the entire grinder bar structure revolves at a relatively low rate of speed in a circle of such a circumference as the particular adjustment of the blocks 6 and 7 will produce.

It is to be observed that the grinding shaft 13 is offset from the axis of the grinding bar (Fig 2). This eccentricity of the grinding shaft 13 (and consequently of the driving wheel 12) may be increased or diminished by adjusting the blocks 6 and 7 up or down. The apparatus is adapted primarily for grinding the interior surfaces of cylindrical objects (engine cylinders for example), and to this end, the ordinary cutting tool is displaced.

Power to drive the train of pulleys and belts from the large pulley 24 is derived from a belt 33 which runs to a suitably mounted counter-shaft. The pulley 24 is made to revolve on the hub 26 as the hub and the appended parts move in their individual circular paths. The swing of the grinding wheel 12 is regulated by means of the adjusting screws 8 and 9 by which the blocks 6 and 7 are moved up or down. Any one of the plurality of recesses in the adjusting blocks may be set upon the lathe centers 2 and 3 depending upon the radius of the circle on which it is desired to have the grinding surface of the wheel 12 run.

The grinding bar is adaptable for use on such cylindrical objects as have openings in the top. An engine cylinder, for example, is usually open at the top and it is through such opening that the grinder bar is extended to reach the tail center 3. The device cannot be used on cylindrical objects which are closed at one end because obviously the right hand bearing of the bar could not then be obtained. It is also desired to say that the grinder bar is not confined in use to lathes but may be applied to other types of machinery.

While the construction and arrangement of the improved grinder bar as herein described and claimed, is that of a generally preferred form, obviously modifications and changes may be made without departing from the spirit of the invention or the scope of the claims.

I claim:—

1. A grinding bar having a hub, a bar structure including a hood and having a housing at which the bar structure is secured to the hub, a grinding shaft eccentrically mounted in the bar structure with one end extending into the housing, a pulley fixed on said extended end of the shaft and concealed by the housing, and a grinding wheel on the other end of the shaft situated beneath said hood.

2. A grinding bar having a hub and a bearing, a large pulley journalled on the hub and adapted to receive driving means, a counter-shaft in the bearing having a pulley at one end with a belt connection to said large hub, a pulley on the other end of said counter-shaft, a bar structure having a housing at which it is secured to the hub said housing having openings, a driving shaft eccentrically mounted in the bar structure, a driving pulley on one end of the shaft extended into the housing to receive a belt from said other pulley through said openings, and a grinding wheel on the other and free end of said driving shaft.

3. A grinding bar having a hub provided with a flange, a housing abutting the flange, means by which the flange is fastened to the housing, a bearing applied to the flange in an upstanding position also secured by said fastening means, a bar structure extending from the housing including a part shaped into a hood which opens downward, a shaft carrying a grinding wheel and journalled off-center on said bar structure so that the wheel has room beneath the hood, a pulley on the shaft situated in the housing, and a countershaft supported by said bearing having a pulley adapted to drive the shaft pulley.

4. A grinding bar having a hub provided with a flange, a housing abutting the flange, means by which the flange is fastened to the housing, a bearing applied to the flange in an upstanding position also secured by said fastening means, a bar structure extending from the housing including a part shaped into a hood which opens downward, a shaft carrying a grinding wheel and journalled off center on said bar structure so that the wheel has room beneath the hood, a pulley on the shaft situated in the housing, a countershaft supported by said bearing having a pulley adapted to drive the shaft pulley, and a main pulley journalled on and adapted to be driven on said hub, and a pulley on said countershaft adapted to be driven by said main pulley.

5. A grinding bar having a hub with a recessed end, a bar structure attached to the hub and having an end cut to leave a flange, screws swivelled in the recessed end and flange, a dog-like extension having a block occupying said recess and applied to the adjacent screw to be workable across the front of the recess, and a block having a flange to receive the other screw and be workable in said cut end, each of said blocks having a plurality of recesses to permit entrance of certain central points.

JAMES RAYMOND HALTERMAN.